United States Patent

[11] 3,565,318

| [72] | Inventor | Frederick S. Sillars<br>Beverly, Mass. |
| --- | --- | --- |
| [21] | Appl. No. | 673,465 |
| [22] | Filed | Oct. 6, 1967 |
| [45] | Patented | Feb. 23, 1971 |
| [73] | Assignee | USM Corporation<br>Flemington, N.J. |

[54] SOLDER APPLICATORS
2 Claims, 4 Drawing Figs.
[52] U.S. Cl. .................................................. 228/37,
113/7, 113/8, 113/11, 228/33, 228/43
[51] Int. Cl. ..................................................... B23k 1/08
[50] Field of Search ........................................ 228/33, 36,
37, 43; 113/7, 8, 11

[56] References Cited
UNITED STATES PATENTS
3,371,838  3/1968  Sillars .......................... 228/43
3,371,837  3/1968  Sillars .......................... 228/43

Primary Examiner—John F. Campbell
Assistant Examiner—Robert J. Craig
Attorneys—W. Bigelow Hall, Richard A. Wise and Richard B. Megley ABSTRACT: An applicator for applying solder to the side seams of moving can bodies. The applicator has a tubular pocket at its discharge portion for containing a body of solder. Means are provided for discharging a jet of solder into the pocket to form a distorted bulbous meniscus having a nipple at its apex at the open end of the pocket. Solder is deposited in the side seams of can bodies which pass through the nipple.

Inventor
Frederick S Sillars
By his Attorney
Richard B. Megley

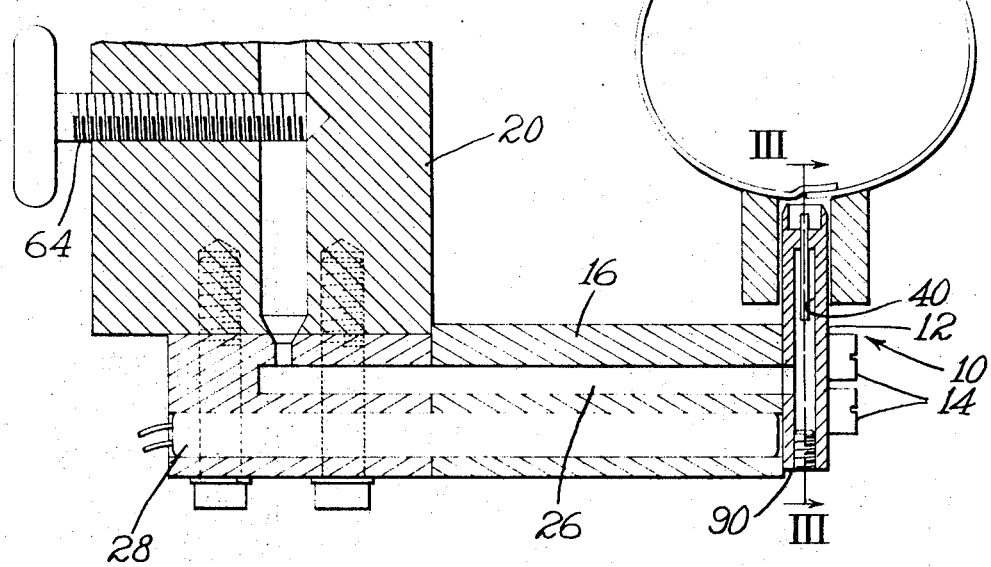
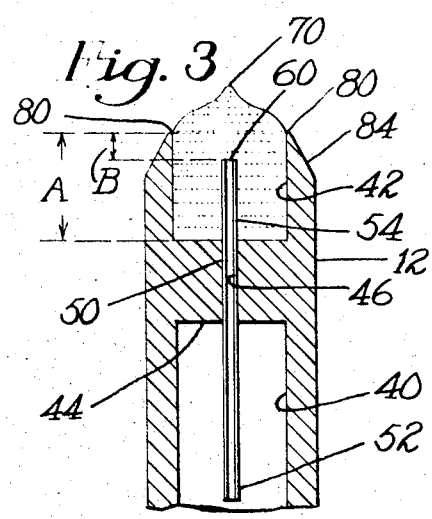
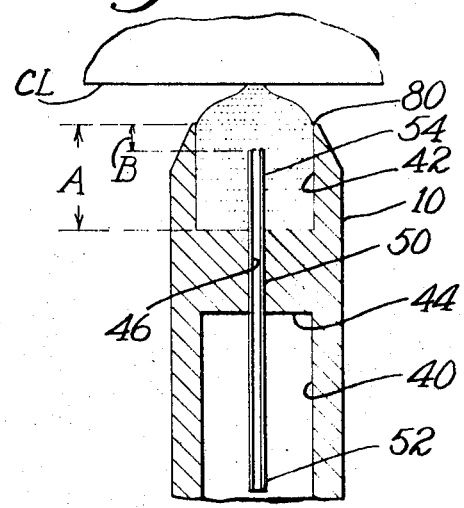

SOLDER APPLICATORS

BACKGROUND OF THE INVENTION

1. Field of the Invention

This invention relates to apparatus for soldering can bodies and, more specifically, to an improved applicator or nozzle for applying solder to the side seams of "tin" cans. The conventional method of forming a tin can is to bend a sheet of metal into a tube and interlock its edges to form a side seam or longitudinal seam joint of interlocked layers. It is to these layers that solder must be applied to seal the side seam. Apparatus including an applicator or nozzle for applying solder to a can formed in the manner just described is disclosed in applicant's U.S. Pat. No. 3,190,528, issued Jun. 22, 1965. The present invention relates to an improved applicator for use with apparatus of the type disclosed in the referenced patent.

2. Description of the Prior Art

Solder applicators of the type disclosed in the referenced patent generally comprise a rigid body having a passageway through which solder is fed from a solder pot to a discharge orifice. Solder is projected from the discharge orifice of the applicator to the side seam of a can body passing thereabove. The solder pot normally has adjusting means for controlling the height of molten solder in the pot. Means are also generally provided for continuously feeding bars of solder into the pot. The applicator is placed in close proximity to the path of movement of the side seams of can bodies passing thereabove in order to assure uniform, continuous deposition of solder. In addition to the low trajectory solder discharge passageway disclosed in the referenced patent, a vertical or high trajectory passageway frequently is employed.

A low trajectory discharge passageway is so oriented that solder is discharged from its orifice with a trajectory the apex of which coincides with the path of movement of the side seam of can bodies moving past the applicator. A vertical or high trajectory passageway, however, projects solder directly upwardly into a side seam located thereabove. When a vertical or high trajectory discharge passageway is used, a shield member such as a roll is employed to prevent solder from squirting through the gaps that normally exist between adjacent can bodies being conveyed past the solder applicator.

Can bodies introduced to side seam soldering machines of the referenced type are initially moved along ceramic guide rails while the side seam is preheated, preferably by an induction heating coil. Flux is applied to the margins of the sheets of metal from which can bodies are formed prior to their being interlocked in a bodymaker. The heating affects not only the metal portion of the can body forming the side seam but also flux which was previously applied. As a result, flux vapors are produced when the side seam is preheated. These flux vapors, together with the flux in the liquid or solid phase which escapes from the side seam, frequently cause clogging of the discharge orifice of the applicator when can bodies are conveyed thereabove. In fact, clogging is an inevitable result; the only question being the time required for the applicator to become inoperative.

Clogging occurs as a result of a number of chemical reactions initiated by the flux. Flux contacts solder discharged from the applicator and reacts with oxides in the solder to form oxide deposits on the applicator. Flux components, particularly those of an organic nature, condense or otherwise lodge around the orifice and carbonize under the influence of heat. Uncarbonized flux deposits in the orifice also cause clogging. Applicators having a vertical or high trajectory discharge passageway are particularly susceptible to clogging of this type due to the orientation of the discharge orifices thereof.

SUMMARY OF THE INVENTION

Accordingly, it is an object of the present invention to provide a solder applicator which is not vulnerable to clogging in the manner discussed above.

To these ends and in accordance with a feature of this invention there is provided in a machine for applying solder to the side seams of moving can bodies, an applicator comprising a body portion having a solder passageway therein and a recessed pocket having an open end proximate the line of flow of said can bodies, means connecting said passageway and said pocket to permit the passage of solder from said passageway to said pocket and for discharging a jet of solder into said pocket whereby solder in said pocket forms a distorted, bulbous meniscus having a nipple at the apex thereof.

BRIEF DESCRIPTION OF THE DRAWINGS

The above and other features of the invention including various novel details of construction and combination of parts will now be more particularly described with reference to the accompanying drawings and pointed out in the claims. It will be understood that the particular embodiment of the invention is shown by way of illustration and not as a limitation of the invention. The principles and features of this invention may be employed in varied and numerous embodiments without departing from the scope of the invention.

In the drawings:

FIG. 2 is a sectional view on an enlarged scale taken along the line II-II of FIG. 1;

FIG. 3 is a sectional view on an enlarged scale taken along the line III-III of FIG. 2 illustrating the meniscus configuration of liquid solder in the solder applicator when a can body is not located thereabove; and FIG. 4 is a sectional view similar to FIG. 3 illustrating the manner in which solder is deposited in the side seam of a can body from the solder meniscus.

DESCRIPTION OF THE PREFERRED EMBODIMENTS

Figure 1:
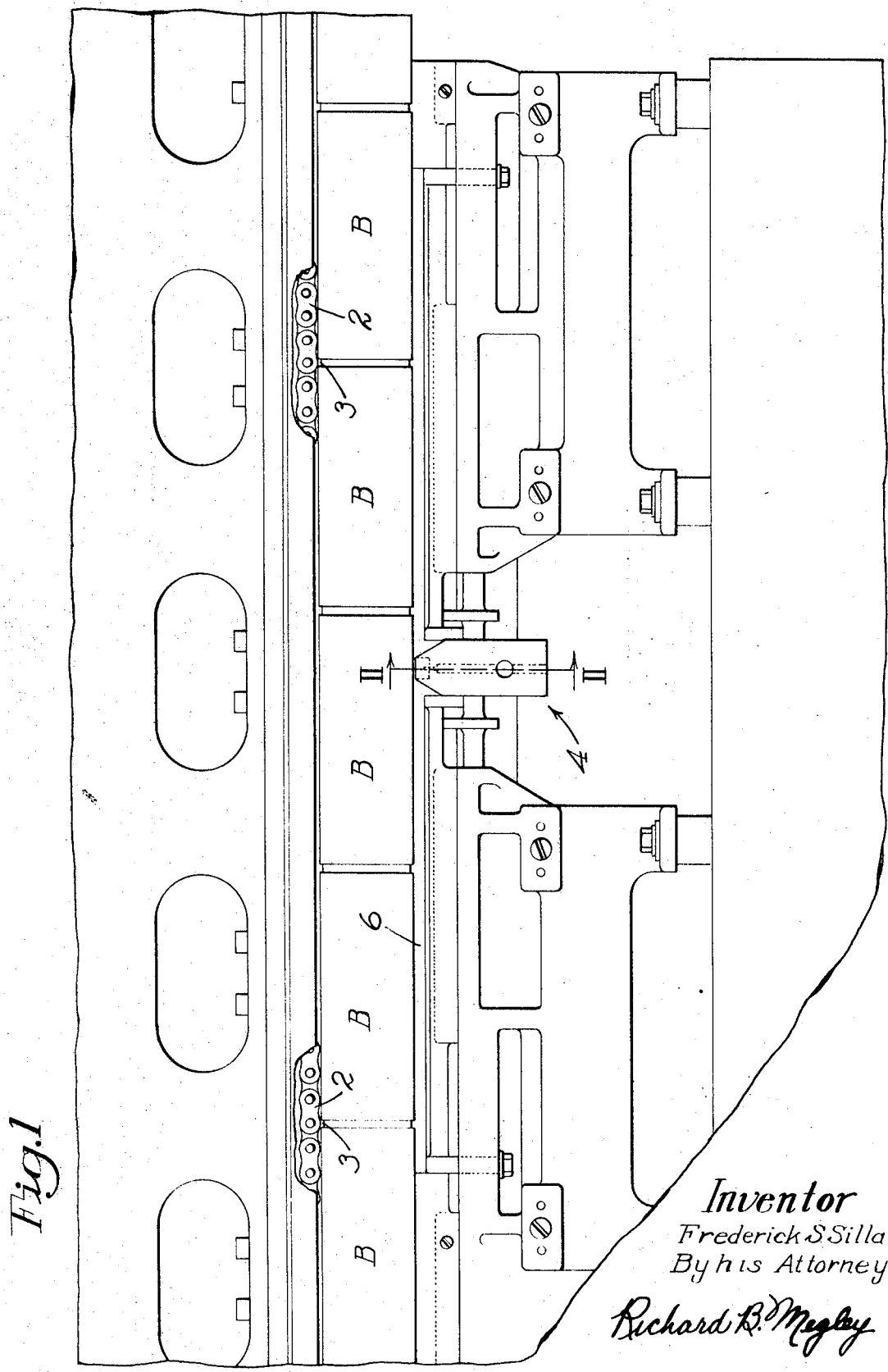
FIG. 1 is a side elevation of a can body soldering machine embodying the invention.

FIG. 1 shows can bodies B which were formed in a bodymaker of any conventional type, not illustrated, being conveyed from left to right in a timed and spaced order by a machine having an endless chain 2 and feed dogs 3 located at predetermined, spaced intervals. Each dog 3 is engageable with the trailing edge of one can body, the spaces between adjacent can bodies being equal to the length of the dogs. The bodies are conveyed past a soldering station 4 which constitutes the locus of this invention. Prior to reaching the soldering station the moving can bodies are heated by any convenient means, as for example, an induction heater 6.

As noted above, this preheating operation produces flux vapors when the temperature of the previously applied flux in the side seam area is elevated above its boiling point. Transfer of additional heat to the flux vapors results in expansion and a correlated pressure increase with the result that flux vapors are urged or forced out of the side seam to be deposited on adjacent portions of the machine. The increase in pressure on the flux also tends to disassociate certain of the flux remaining in the solid and liquid phase from the side seam whereby it too escapes and is deposited on portions of the machine in its path of escape. Accordingly, unless means are provided to prevent escaping flux from locating at the solder discharge passageway of the applicator it will become clogged by a buildup of carbonized flux and flux oxide deposits, etc.

As hereinafter described in greater detail, an applicator embodying the present invention includes a cylindrical cavity or tubular pocket at the discharge portion of the applicator which is normally filled with solder whereby to shield the discharge orifice of the applicator which is located below the upper end of the tubular pocket.

The soldering station 4 includes a nonyieldable, rigid solder applicator 10 (FIGS. 2—4) having a unitary body 12 which is secured by screws 14 to an arm 16 (FIG. 2) extending from the bottom of a solder reservoir 20. The reservoir 20 includes adjusting means, not shown, for controlling the height of molten solder and means for continuously feeding bars of solder to the reservoir whereby the pressure head of molten solder is maintained at a predetermined level. Solder in the reservoir 20 is maintained in a molten state during operation of the machine by heaters (not shown) located in each corner of the reservoir. Solder flows from the reservoir 20 through the arm 16 in a horizontal passageway 26 which is maintained at a constant predetermined temperature by a resistance heater 28.

The body 12 of the applicator 10 has a solder passageway 40 in the lower portion thereof and a tubular pocket 42 in the upper portion thereof. The solder passageway 40 communicates with the passageway 26 in the arm 16. The passageway 40 and tubular pocket 42 are separated by an annular shoulder 44 having an elongated aperture 46 therein. In the preferred embodiment, a flow tube 54 is force fit into the aperture 46. The lower end portion 52 of the flow tube depends downwardly from the shoulder 44 into the central portion of the passageway 40 to remove solder from the central portion thereof. Slag and solder oxides are formed in the solder reservoir 20 during the melting of the bars of solder. The slag or oxides of solder pass through the passageways described above and rise to the upper portion of the passageway 40 due to the lower specific gravity of the slag or oxides with respect to solder. Thus drawing solder from the central portion of the passageway 40 minimizes the amount of impurities such as slag or solder oxides passing into the well or pocket 42. The upper end portion 54 extends upwardly from the shoulder portion 44 into the central portion of the tubular well 42.

In the preferred embodiment, the tubular well 42 has a depth (A) of one-quarter of an inch and the upper end or discharge orifice 60 of the flow tube 50 is spaced a distance (B) of one-sixteenth of an inch from the upper end of the tubular pocket 42. The flow tube 50 preferably has an inside diameter of 0.027 and is 1½ inches in length. The diameter of the passageway 40 and tubular pocket 42 are both ¼ inch in the preferred embodiment.

In the use of the solder applicator 10 just described, the applicator is initially heated by means of the heater 28 prior to introduction of any solder thereto. Heat is quickly transferred to the applicator 10 including the walls of the pocket 42 as the arm 16 and applicator 10 are both constructed of metal. When the temperature of the applicator is elevated to a predetermined, desired level; conventional valve means 64 associated with the reservoir 20 are "cracked" to allow solder to flow through the passageway 26 to fill the passageway 40 and thereafter to flow at a low velocity through the flow tube 50 and fill the tubular pocket 42. When sufficient solder has been supplied to the tubular pocket, i.e. when it is filled, a convex meniscus will be formed at the upper end thereof due to the effect of surface tension. The valve means 64 associated with the reservoir 20 are then opened to increase the velocity of solder flowing through the flow tube 50 to a predetermined, operative level. The solder which thereafter is discharged from the flow tube 50 distorts the convex meniscus configuration discussed above and produces a bulbous meniscus configuration having a nipple 70 at the apex thereof, see FIG. 2. Can bodies are thereafter passed over the applicator with the side seams thereof in vertical alignment with the nipple 70 and at a level below the top of the nipple 70 whereby solder is continuously deposited thereon.

As clearly illustrated in FIG. 3, the discharge end or orifice 60 of the flow tube 50 is below the level of the meniscus and is thus shielded from flux and other foreign matter. The path of the side seams of can bodies C.L. introduced to the machine, i.e. the "tin line" or "can line" intersects the nipple 70 whereby solder is continuously removed from the nipple portion 70 of the distorted meniscus. The side seams of can bodies are thus soldered without the need for stoppage due to clogging of the submerged flow tube orifice.

The exact configuration of the distorted meniscus is determined by the velocity of the solder jet discharged from the flow tube 50. If the velocity is too great, the surface tension of the meniscus will be broken and the solder jet will be directed into the side seam. While this per se is not harmful except for the wastage of solder and maintenance problems, it will, within a short period, result in exposure of the discharge orifice 60 of the flow tube 50 to flux and the like. That is, the passage of the solder jet through the well 42 normally effects continuous circulation and removal of solder and impurities present therein from the column of solder in the well 42. The phenomenon is best described as the consequence of surface friction drag. The relatively fast moving jet picks up certain of the solder in the pocket adjacent its path due to liquid friction, pressure differentials etc. This phenomenon results in the continuous removal of solder from the pocket 42 and, therefore, continuous circulation of solder therein. Solder removed from the pocket 42 is replaced by solder discharged from the flow tube which does not breach the meniscus and is not deposited on a can body at the nipple 70. If, however, the velocity of the solder jet is increased such that the meniscus is broken and excess solder deposited in and adjacent to the side seam, the level of the meniscus in the pocket will gradually be lowered due to removal of solder by surface friction drag.

Applicant has found, that if the velocity is not properly controlled and becomes excessive, the meniscus will gradually assume a somewhat concave configuration within the pocket 42 and ultimately be lowered to a level at or below the level of the discharge orifice 60 thereby exposing the discharge orifice 60. Thus, it is important in the practice of this invention that the velocity of solder discharged from the orifice be controlled such that a bulbous meniscus configuration having a nipple 70 is maintained as illustrated in FIG.. FIG. 4 illustrates the meniscus shown in FIG. 3 with a can body exposed thereto and solder being removed therefrom. Proper control of the velocity of the solder jet results in continuous circulation of solder within the pocket 42 and uniform disposition of solder on side seams bisecting the nipple 70.

Similarly, the velocity of the jet of solder discharged from the flow tube 50 must be sufficient to distort the meniscus to form the nipple 70. The control of velocity of the jet may be readily accomplished by conventional valve means (not shown).

In the preferred embodiment, the upper end 80 of the pocket 42 is pointed, in cross section as shown in FIGS. 3 and 4, and formed by the intersection of the interior wall of the pocket 42 and a sloping sidewall 84 which forms the upper end of the applicator body 12. This construction is preferred as it minimizes the effect of the attraction of solder to the adjacent exterior surfaces of the applicator. A convex or bulbous meniscus configuration, as discussed above, may be readily maintained with this construction as excess solder flowing to the tubular pocket 42, particularly when a can body is not exposed to the applicator, will overflow down the sloping sidewall 84.

Also in the preferred embodiment, the interior surfaces of the pocket 42, including the exposed portion of the flow tube 50, are tinned stainless with a composition of stainless steel flux and solder. This ensures "wetting" of solder in the pocket 42 with the sidewalls of the pocket to avoid a separation therebetween through which air, flux or similar undesirable impurities might flow.

When the flow of solder is stopped and the heaters turned off, the solder then present in the pocket 42 will solidify and form a protective shield for the discharge orifice 70 of the flow tube 50. Subsequent use of the applicator 10 is initiated by heating the applicator and protective residue of solder in the pocket 42 in the manner discussed above.

The lower end of the passageway 40 is closed by a plug 90. The passageway 40 may be easily and completely cleaned by removing the plug 90 to permit the insertion of a cleaning tool through the entire extent of the passageway 40. The pocket 42 is readily accessible for cleaning.

I claim:

1. In a machine for applying solder to the side seams of moving can bodies, an applicator comprising a body portion having a passageway therein and a recessed well having a bottom, continuous solder-supporting sides and an open end proximate the line of movement of said can bodies, means connecting said passageway and said well for restricting solder flow from said passageway to said well and for discharging a jet of solder into said well when said well has a reservoir of solder therein whereby to form a distorted, bulbous solder meniscus with a nipple at the apex thereof.

2. An applicator according to claim 1 wherein the connecting means comprise a flow tube of substantially less diameter than said well and which projects into said well and which connecting means is shielded from impurities by said meniscus.